United States Patent
Liefer et al.

(10) Patent No.: US 6,857,350 B1
(45) Date of Patent: Feb. 22, 2005

(54) APPLIANCE AND PROCESS FOR REDUCING DISTORTION OF SLIT METAL SHEET

(75) Inventors: Kalin Liefer, Red Bud, IL (US); Elroy Schoenbeck, Red Bud, IL (US)

(73) Assignee: Red Bud Industries, Inc., Red Bud, IL (US)

( * ) Notice: Subject to any disclaimer, the term of this patent is extended or adjusted under 35 U.S.C. 154(b) by 436 days.

(21) Appl. No.: 09/358,666

(22) Filed: Jul. 22, 1999

(51) Int. Cl.[7] .............................. B26D 3/00; B21B 1/00
(52) U.S. Cl. ...................... 83/872; 83/156; 83/425.3; 72/203
(58) Field of Search ............................. 83/156, 425.4, 83/425.3, 425.2, 649, 949, 872, 449, 446, 436.15; 72/203, 246

(56) References Cited

U.S. PATENT DOCUMENTS

| | | | | |
|---|---|---|---|---|
| 2,214,618 A | * | 9/1940 | Kenyon et al. | 228/158 |
| 2,775,151 A | * | 12/1956 | Schumacher | 72/226 |
| 3,650,168 A | * | 3/1972 | Ruschmann | 83/114 |
| 3,724,251 A | * | 4/1973 | Wegner | 72/203 |
| 3,768,293 A | * | 10/1973 | Ruesch | 72/203 |
| 4,580,336 A | * | 4/1986 | Kerley et al. | 29/605 |
| 4,866,967 A | * | 9/1989 | Sporenberg et al. | 72/129 |
| 4,887,502 A | | 12/1989 | Voges | |
| 5,592,845 A | * | 1/1997 | Gerenser et al. | 72/161 |
| 5,755,131 A | * | 5/1998 | Voth | 72/240 |

* cited by examiner

Primary Examiner—Allan N. Shoap
Assistant Examiner—Jason Prone
(74) Attorney, Agent, or Firm—Polster, Lieder, Woodruff & Lucchesi, L.C.

(57) ABSTRACT

A machine for slitting metal sheet with rotating knives has roller assemblies which present rollers against the metal sheet immediately beyond the knives. The rollers bear against both faces of the slit metal sheet and straddle the slits, all to reduce distortion caused by the knives and to iron out burrs. The roller assemblies are fitted to tracks on the slitting machine and may be moved along those tracks to accommodate relocation of the knives.

14 Claims, 3 Drawing Sheets

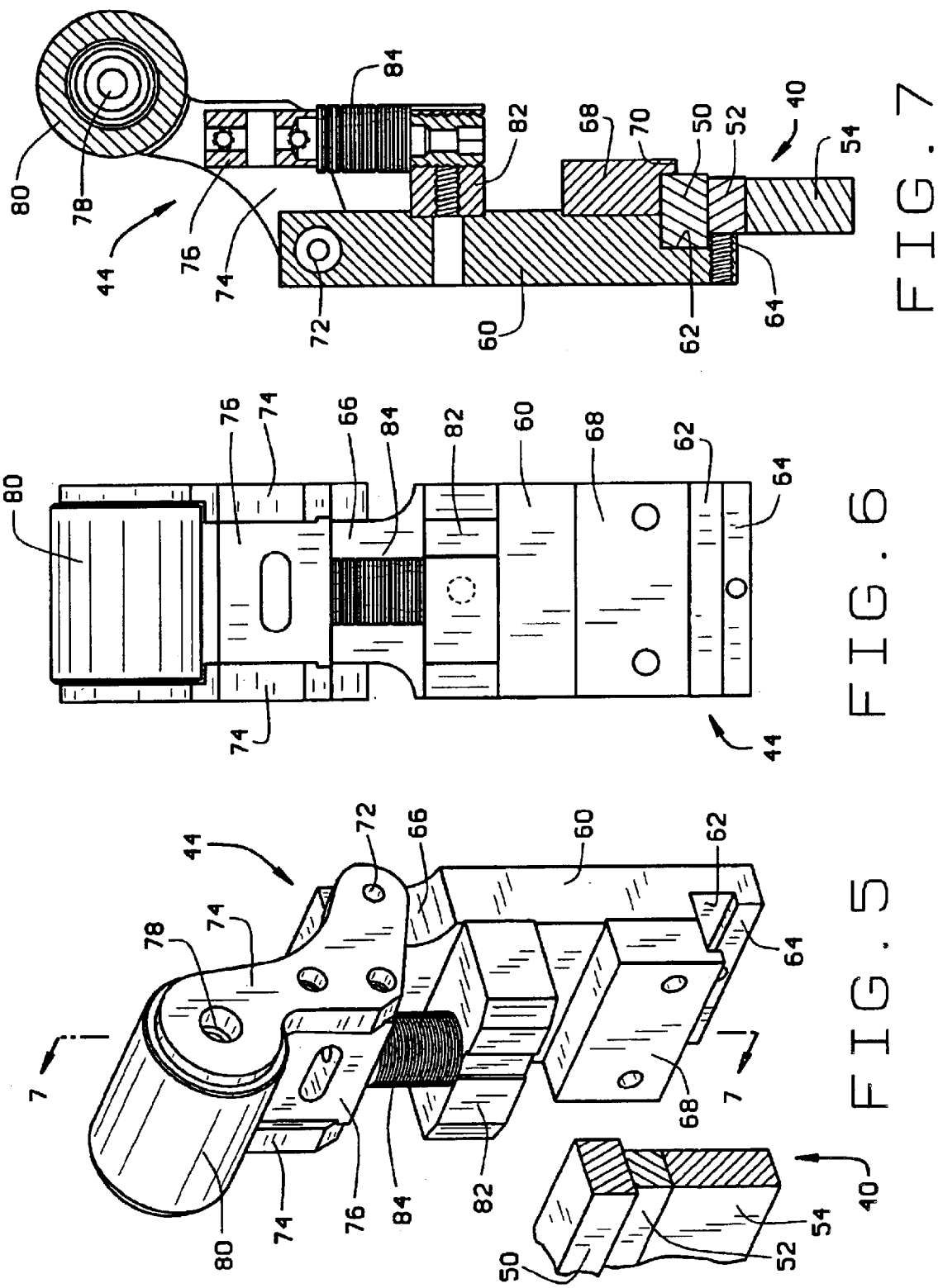

APPLIANCE AND PROCESS FOR REDUCING DISTORTION OF SLIT METAL SHEET

CROSS-REFERENCE-TO RELATED APPLICATIONS

STATEMENT REGARDING FEDERALLY SPONSORED RESEARCH OR DEVELOPMENT

Not Applicable.

BACKGROUND OF THE INVENTION

This invention relates in general to machines for slitting sheet metal and more particularly to an appliance and process which reduces distortion of the sheet by such machines.

Steel mills furnish steel sheet in coils which rarely correspond in width to any of the multitude of products that are produced from such sheet. To facilitate the manufacture of such products, the steel sheet of a coil is withdrawn from the coil and slit longitudinally to sizes suitable for the products. Indeed, slitting machines exist for this purpose. Each metal strip derived from the slitting is then passed through a shear where it is cut into segments of appropriate length or else is rewound into a coil for subsequent processing or use.

The typical slitting machine has a frame in which upper and lower arbors rotate. The arbors in turn carry knives, which in essence are disks that approach each other at a nip. Here, the disks are offset slightly so that the side face of the upper disk lies slightly beyond the opposite side face of the lower disk. Moreover, at the nip the spacing between the offset knives is less than the thickness of the sheet. Thus, as the steel sheet passes into and through the nip formed by a pair of knives, it undergoes a fracture which creates the slit.

As the steel sheet emerges from the nip between the upper and lower knives of a pair, the upper knife deflects the portion of the slit sheet against which it bears downwardly, while the lower knife deflects the portion of the slit sheet against which it bears upwardly. In conventional slitting machines stripper blades or rings prevent the slit sheet from deflecting excessively. Even so, the several strips which are formed in the slitting acquire distortions which leave them somewhat warped.

BRIEF SUMMARY OF THE INVENTION

The present invention resides in the installation of rollers on a machine for slitting metal sheet with rotating knives. The rollers bear against the metal sheet along the slits imparted by the knives reform the metal sheet and keep distortions minimal. The rollers may be repositioned to accommodate changes in position for the knives in the machine. The invention also consists in the parts and in the arrangements and combinations of parts hereinafter described and claimed.

BRIEF DESCRPTION OF THE SEVERAL VIEWS OF THE DRAWINGS

In the accompanying drawings which form part of the specification and wherein like numerals and letters refer to like parts wherever they occur:

FIG. 5 is a perspective view of a lower roller assembly;

FIG. 6 is a front elevational view of the lower roller assembly; and

FIG. 7 is a sectional view of the lower roller assembly taken along line 7—7 of FIG. 5.

Corresponding reference numerals will be used throughout the several figures of the drawings.

DETAILED DESCRIPTION OF THE INVENTION

Figure 1:
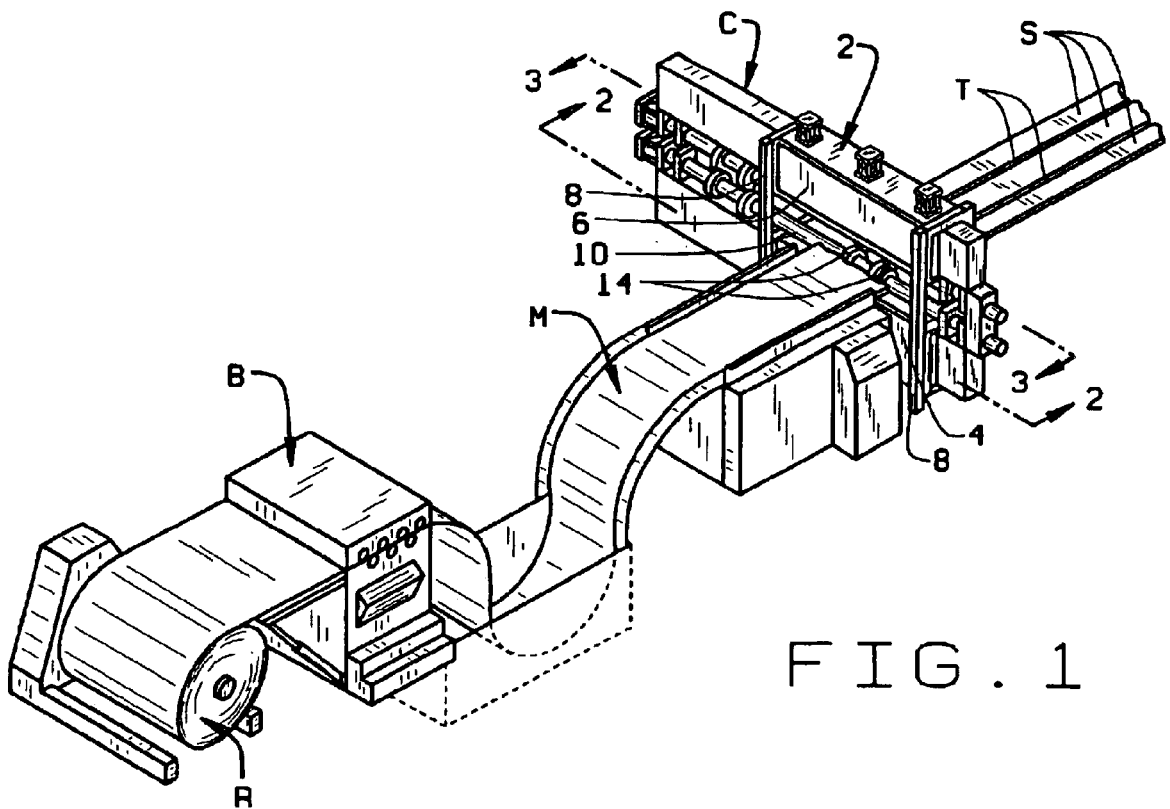
FIG. 1 is a perspective view of equipment employed to slit metal sheet, including a slitting machine where the actual slitting occurs.
Figure 3:
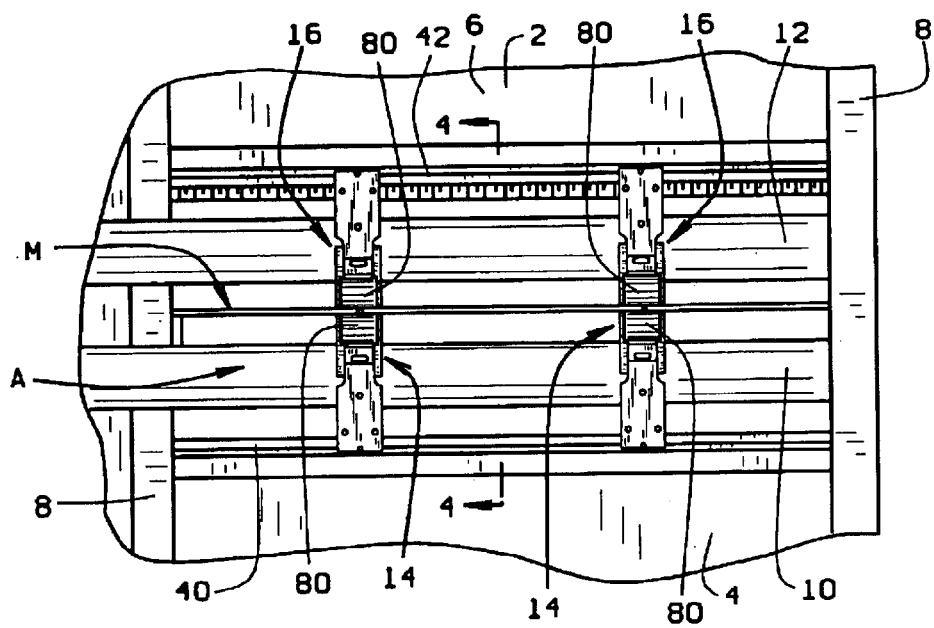
FIG. 3 is an elevational view taken along line 3—3 of FIG. 1 and showing the downstream end of the slitting machine including the appliance of the present invention.
Figure 4:
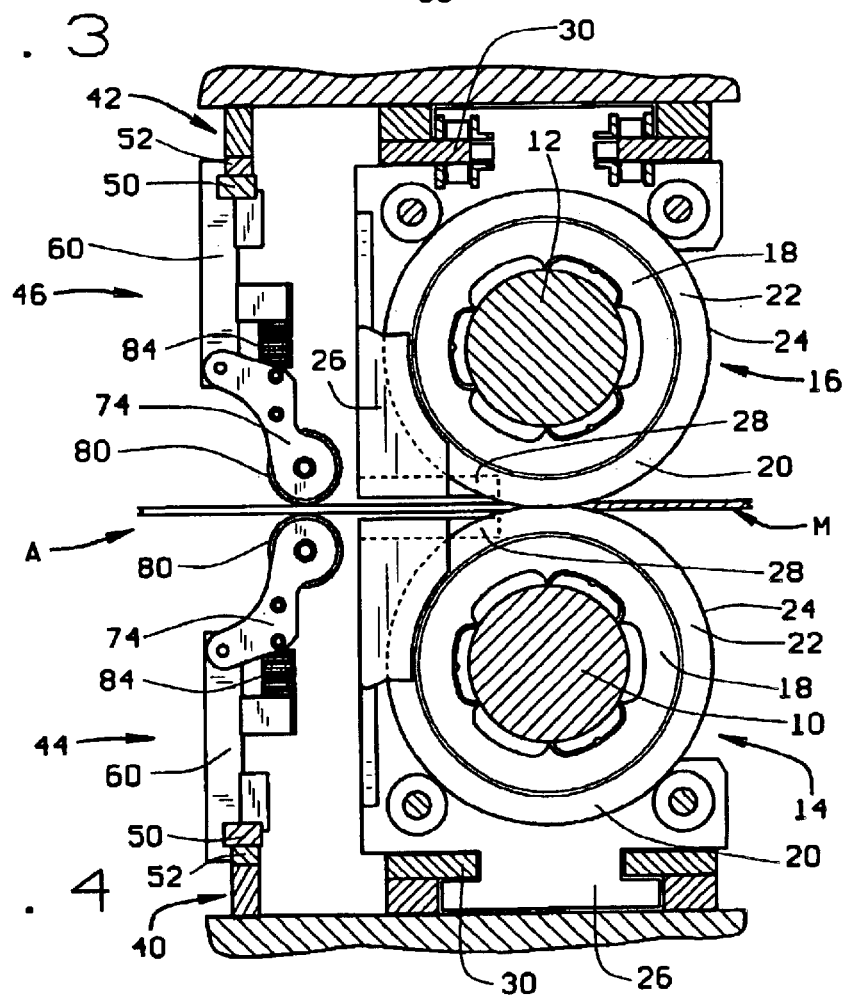
FIG. 4 is a sectional view taken along line 4—4 of FIG. 3 and showing the knives and the roller assemblies with the knives partially broken away and in section.

Referring now to the drawings, a metal sheet M (FIG. 1), such as sheet steel, which is supplied in a coil or roll R is withdrawn from the roll R by a straightening machine B which removes coil set. Beyond the straightening machine B the metal sheet M passes through a slitting machine C which cuts it into several strips S along slits T. The slitting machine C tends to distort the metal at any slit T, pushing one strip S upwardly and the adjacent strip S downwardly. But the machine C, where the strips S emerge from it, carries an appliance A (FIGS. 3 & 4) which reduces the distortion, keeping it at a minimum which is almost imperceptible, and further reduces burrs.

Considering the slitting machine C first, it includes (FIGS. 1–3) a bridge-type frame 2 having lower and upper beams 4 and 6 which are supported on posts 8. The frame 2 carries lower and upper mandrels 10 and 12 which rotate about parallel axes. While the upper mandrel 12 rotates in bearings that are fixed firmly in position on the upper beam 6, the bearings in which the lower mandrel 10 rotates may be adjusted upwardly and downwardly. This, of course, changes the spacing between the two mandrels 10 and 12. Yet the adjustment is such that the axes of the mandrels 10 and 12 remain parallel. The lower mandrel 10 carries knives 14 (FIGS. 2 & 4), while the upper mandrel 12 carries knives 16. Each knife 14 and 16 basically consists of a hub 18 which fits snugly over the mandrel 10 or 12 and a relatively narrow disk 20 which projects from the hub 18 and is fixed with respect to it. The disk 20 has parallel side faces 22 which lie in planes perpendicular to the axes of the two mandrels 10 and 12 and a peripheral surface 24 which, although narrow, lies within a cylindrical envelope, the center of which is the axis for the mandrel 10 or 12 on which the hub 18 and disk 20 are mounted. Actually, the peripheral surfaces 24 for all of the knives 14 on the lower mandrel 10 lie in the same cylindrical envelope, and the peripheral surfaces 22 for all of the knives 16 on the upper mandrel 12 lie within another cylindrical envelope.

Figure 2:
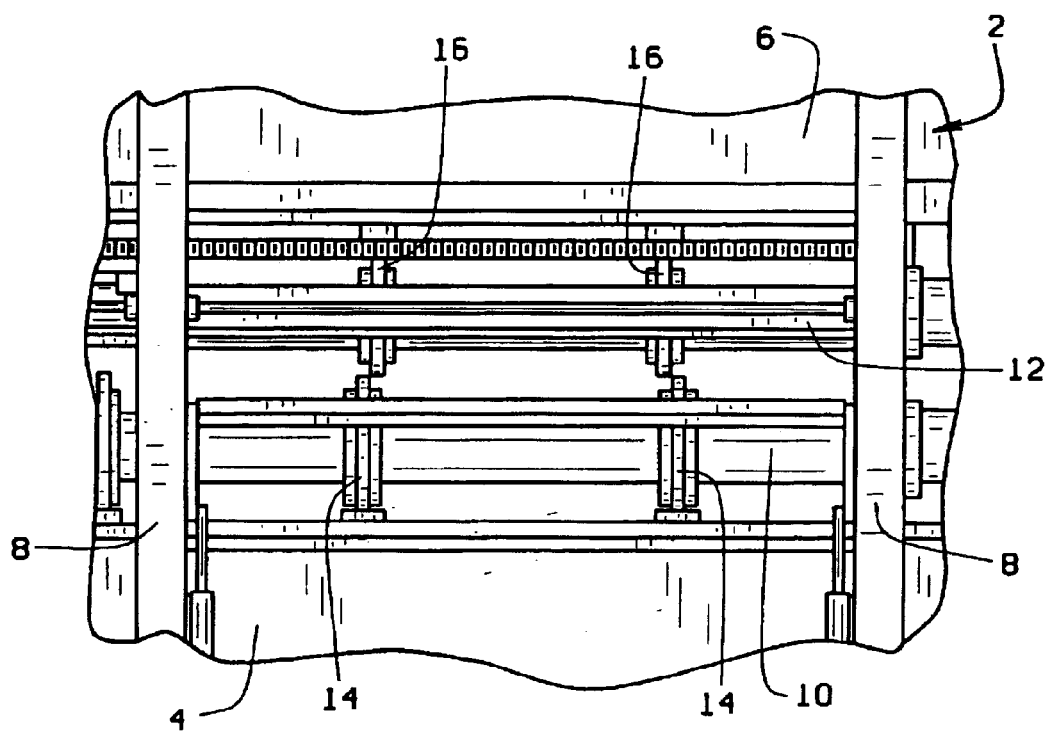
FIG. 2 is an elevational view taken along line 2—2 of FIG. 1 and showing the upstream end of the slitting machine.

The knives 14 and 16 on the two mandrels 10 and 12 are arranged in pairs, there being for every knife 14 on the lower mandrel 10 a corresponding knife 16 on the upper mandrel 12. Within any pair of knives 14 and 16, the disks 20 for those knives 14 and 16 are slightly offset so that the peripheral surface 24 on the disk 20 of the lower knife 14 is not located directly opposite the peripheral surface 24 for the disk 20 of the upper knife 16 (FIG. 2). Indeed, the offset is such that the planes for opposite side faces 22 of the disks 20 for the two knives 14 and 16 are quite close together. Moreover, the cylindrical envelopes for the peripheral surfaces 24 on the two knives 14 and 16 at their closest point are spaced apart a distance less than the thickness of the metal sheet M. This point, in a sense, represents a nip between the peripheral surfaces 24 on the disks 20 of the knives 14 and 16 that form the pair.

When the metal sheet M enters the nip between two knives 14 and 16 of a pair, the peripheral surface 24 on the lower knife 14 forces the sheet metal M upwardly, while the peripheral surface 24 on the upper knife 16 forces the sheet metal 14 downwardly. Since the spacing between the peripheral surfaces of the two knives 14 and 16 is less than the thickness of the sheet metal M, the metal M fractures, creating one of the slits T.

Where more than one slit T is made, the knives 14 and 16 for making those slits are arranged to produce the least distortion in the metal sheet M. For example, where two slits T are formed, requiring two pairs of knives 14 and 16, the knives 14 and 16 of the one pair are arranged in an orientation opposite to the orientation of the knives 14 and 16 of the other pair, so that the center strip S is not deflected upwardly along the slit T at its one side and downwardly along the slit T at its other side, but instead is either deflected upwardly or downwardly along both slits T at its sides. Devices exist for minimizing the deflection. For example, each knife 14 and 16 may revolve in a carriage 26 that contains a stripper blade 28 against which the strip S bears as it emerges from the nip between the knives 14 and 16. The carriages 26 follow ways 30 on the beams 4 and 6 and further back the knives 14 and 16 to resist the spreading force imparted by the metal sheet M. Despite the alternate orientation of the knives 14 and 16 and despite the devices for minimizing distortion, the strips S emerge with some distortion. In some cases, this remaining distortion is unacceptable for subsequent fabrication. The appliance A reduces the distortion to acceptable levels.

Absent the appliance A, the slitting machine C is in production at Red Bud Industries, Inc., of Red Bud, Ill. U.S. Pat. No. 4,887,502 discloses the machine C in more detail.

The appliance A for correcting distortion includes (FIGS. 3 & 4), a lower track 40 which is attached firmly to the lower beam 4 of the frame 2 along the upper surface of that beam beyond the ways 30 for the lower knives 14. It also includes an upper track 42 which is attached to the upper beam 6 along the lower surface of that beam, again beyond the ways 30 for the upper knives 16. The tracks 40 and 42 lie parallel to each other and also parallel to the axes of the mandrels 10 and 12. In addition, the appliance A has lower roller assemblies 44 mounted on the lower track 40 and upper roller assemblies 46 mounted on the upper track 42, there being both a lower roller assembly 44 and an upper roller assembly 46 beyond each pair of lower and upper knives 14 and 16 on the mandrels 10 and 12. Thus, the lower and upper roller assemblies 44 and 46 are likewise arranged in pairs, with a pair of them being at each slit T formed in the sheet M. Indeed, the sheet M, after emerging from the knives 14 and 16 where it is slit, passes between the pairs of lower and upper roller assemblies 44 and 46. Here the roller assemblies 44 and 46 bear against both faces of the sheet M on both sides of each slit T in the sheet M. When not under load, the roller assemblies 44 and 46 move easily along their respective tracks 40 and 42 so that they may be repositioned to accommodate relocation of the knives 14 and 16 along the mandrels 10 and 12.

Each track 40 and 42 includes (FIG. 4) a gib bar 50 and a spacer 52 behind the gib bar 50 as well as an underlying bar 54. Both the gib bar 50 and the spacer 52 possess rectangular cross-sections, but the gib bar 50 is wider than the spacer 52 and projects both forwardly and rearwardly from the spacer 52. The gib bar 50 for the lower track 40 overlies the spacer 52 for that track 40 and the spacer 52 rests on the underlying bar 54. All three are secured against the upper surface of the lower beam 4 with machine screws which pass through them and thread into the beam 4. The gib bar 50 for the upper track 42 lies beneath the spacer 52 for that track 42 and the spacer 52 lies under an overlying bar 54. All three are attached to the downwardly presented surface of the upper beam 6 with more machine screws which pass through them and thread into the upper beam 6. While the tracks 40 and 42 are attached to opposite horizontal surfaces of the beams 4 and 6, they lie along the front edges of those beams 4 and 6, that is beyond the nips formed by the pairs of knives 14 and 16.

Each lower roller assembly 44 includes (FIGS. 5–7) a pivot mount 60 which is fitted to the lower track 40 such that it cannot be removed from the track 40, yet can slide along the track 40. To this end, the mount 60 has a groove 62 that opens forwardly near its lower end, leaving a rib 64 immediately below the groove 62. The groove 62 is as deep as the distance the gib bar 50 projects rearwardly beyond the spacer 52. Indeed, the mount 60 fits to the track 40 with the rearwardly projecting portion of the gib bar 50 received in the groove 62 and with the rear face of the spacer 52 against the vertical face of the rib 64. At its upper end the pivot mount 60 has a head 66 of reduced width.

The pivot mount 60 is retained on the lower track 40 with a clamp 68 which is attached firmly to the mount 60 with machine screws. The clamp 68 lies directly over and rests on the upper surface of the gib bar 50. Moreover, the clamp 68 has a flange 70 which projects downwardly along the front face of the gib bar 50. The clamp 68 together with the groove 62 in the bottom of the pivot mount 60 captures the gib bar 50 for the lower track 40 in the lower end of the pivot mount 60, so that the lower roller assembly 44 cannot be removed from track 40. Even so, the fit is loose enough to enable the roller assembly 44 to slide along the track 40 when not under a moment-producing load.

The reduced head 66 of the pivot mount 60 contains an axle 72 which lies parallel to the groove 62 and track 40, and the axle 72 in turn supports pivot arms 74 which project obliquely, that is to say upwardly and rearwardly, from the head 66. The two pivot arms 74 are connected intermediate their ends by a spacer 76 to which they are fastened with more machine screws. The opposite ends of the pivot arms 74 are connected by another axle 78 which supports a roller 80 that rotates freely on the axle 78 and between the ends of the pivot arms 74. The roller 80 has a cylindrical exterior surface.

The spacer 76 has a downwardly presented surface which extends generally horizontally, and beneath that surface a spring pad 82 is secured against the front face the pivot mount 60 with still more machine screws. The spring pad 82 has an upwardly presented surface which lies generally parallel to the downwardly presented surface on the spacer 76, and between these two surfaces lies a spring 84 in the form of a stack of Belleville washers. The spring 84 is retained in place between the two surfaces by a machine screw which passes through the spring pad 82 and thence through the washers which constitute the spring 84 and finally threads into the spacer 76.

The spring 84 prevents the pivot arms 74 from dropping, and indeed holds them in an upwardly directed orientation— one in which the cylindrical exterior surface of the roller 80 is urged to the path of the metal sheet M so that it will bear against the underside of the metal sheet M as it emerges from the knives 14 and 16 of the slitting machine C. Actually, arms 74 yield slightly against the bias of the spring 84 when metal sheet M bears against the roller 80, so the roller 80 exerts an upwardly directed force on the metal sheet M as it emerges from the knives 14 and 16.

The upper roller assembly 46 is identical to the lower roller assembly 44, but the groove 62 in its pivot mount 60 and its clamp 68 capture the gib bar 50 of the upper track 42. As such, the upper assembly 46 is suspended from the upper track 42 with its roller 80 presented downwardly such that it will bear against the upper surface of the metal sheet M as the metal sheet M emerges from the knives 14 and 16. Like the lower roller assembly 44, the upper roller assembly 46, slides easily along its track 42 when unrestrained. As such, it may be positioned directly above the lower roller assembly 44 so that the rollers 80 of the two assemblies 44 and 46 create a nip through which the sheet metal M passes as it emerges from the knives 14 and 16. In this regard, a slight space exists between the rollers 80 at the nip or else they barely contact each other at the nip. This enables the roller assemblies 44 and 46 to be moved to positions directly opposite to each other on the tracks 40 and 42. Even so, the spacing between the rollers 80 at the nip, when the metal sheet M is not present, is less than the thickness of the metal sheet M.

When the metal sheet M passes between the rollers 80 of aligned upper and lower roller assemblies 44 and 46 the springs 84 of the roller assemblies 44 and 46 should exist in a state of compression and indeed should cause the rollers 80 to exert a compressive force on the metal sheet M. Preferably, the rollers 80 are between 2 and 4 inches wide. When exerting a force on the metal sheet, the pivot mounts 60 at the grooves 62 and the clamps 68 of the two roller assemblies 44 and 46 bind on the gib bars 50 of the track 40 and 42, and this prevents the roller assemblies 44 and 46 from migrating along the tracks 40 and 42. A set of lower and upper roller assemblies 44 and 46 exist for each pair of lower and upper knives 14 and 16 on the lower and upper mandrels 10 and 12 of the slitting machine C.

To prepare the machine C for slitting the metal sheet M, the knives 14 and 16 are positioned along their mandrels 10 and 12 at the locations where slits T are to be imparted to the metal sheet M. To this end, a pair of lower and upper knives 14 and 16 are moved to the location along their respective mandrels 10 and 12 where the first slit T is to be formed and are secured such that the proper spacing exists between the opposite side faces 22 on the disks 20 for the knives 14 and 16. Moreover, the height of the lower mandrel 10 is adjusted if necessary so that the cylindrical surfaces 24 on the disks 20 of the two knives 14 and 16 are spaced the proper distance apart which is less than the thickness of the metal sheet M.

Another pair of knives 14 and 16 is moved into position on their respective mandrels 10 and 12 at the location where the next slit T is to be formed, and once the spacing between opposite side faces 22 on the disks 20 of those knives 14 and 16 is set, the disks 20 of the knives 14 and 16 are secured firmly to the mandrels 10 and 12 at their hubs 18.

After the sets of knives 14 and 16 are positioned along the mandrels 10 and 12 to create slits T in the metal sheet M, the sets of roller assemblies 44 and 46 are positioned along the tracks 40 and 42, immediately beyond the sets of knives 14 and 16. Basically, for each set of knives 14 and 16, a set of roller assemblies 44 and 46 is moved along the tracks 40 and 42 until the rollers 80 of the set are located immediately beyond the nip between the disks 20 for the set of knives 14 and 16 with which the set of roller assemblies 44 and 46 corresponds. Indeed, the rollers 80 for the roller assemblies 44 and 46 should straddle the slit T formed by the knives 14 and 16 in the metal sheet M. However, the roller assemblies 44 and 46 need not be set with the precision required in setting the knives 14 and 16.

Once the knives 14 and 16 are positioned properly on the mandrels 10 and 12 and the roller assemblies 44 and 46 are positioned on their tracks 40 and 42 beyond the knives 14 and 16, the metal sheet M is introduced into the slitting machine C and advanced through the knives 14 and 16. The knives 14 and 16 fracture the metal sheet M at the nips between their disks 20, so the metal sheet M emerges from the knives 14 and 16 as several strips S separated at slits T. To be sure, the disks 20 of the knives 14 and 16 impart distortions to the strips S, in that the disk 20 for the lower knives 14 push any strip S against which they bear upwardly, while the disks 20 for the upper knives 16 push any strip S against which they bear downwardly.

But immediately beyond each set of knives 14 and 16, the strips S at the slits T between them pass between the rollers 80 of the upper and lower roller assemblies 44 and 46. Indeed, the springs 84 of the roller assemblies 44 and 46 exert a compressive force on the strips S at the slits T, and this reforms strips S to minimize the distortions imparted by the knives 14 and 16. The opposed rollers 80 at each slit T further iron out burrs imparted by the knives 14 and 16, so the strips S emerge from the slitting machine C with smooth edges along the slits T.

This invention is intended to cover all changes and modifications of the example of the invention herein chosen for purposes of the disclosure which do not constitute departures from the spirit and scope of the invention.

APPLIANCE AND PROCESS FOR REDUCING DISTORTION OF SLIT METAL SHEET

M metal sheet
R roll
B straightening machine
C slitting machine
S strips
T slits
2. frame
4. lower beam
6. upper beam
8. posts
10. lower mandrel
12. upper mandrel
14. knives (lower)
16. knives (upper)
18. hub
20. disk
22. parallel side faces
24. peripheral surface
26. carriage
28. stripper blades
30. ways
40. lower track
42. upper track
44. lower roller assembly
46. upper roller assembly
50. gib bar
52. spacer
54. bar
60. pivot mount
62. groove 64. rib
66. reduced head
68. clamps
70. rib
72. axles
74. pivot arms
76. spacer
78. axle
80. roller
82. spring pad
84. spring

What is claimed is:

1. In a slitting machine including a frame, first and second mandrels mounted on the frame for rotation about parallel axes, and first and second knives mounted on the first and second mandrels, respectively, with each knife having a disk which rotates with its mandrel, the disks of the first and second knives, when rotating, approaching each other at a nip and being located such that metal sheet upon entering the nip is fractured by the disks, thus imparting a slit to the metal sheet and dividing the sheet into strips which are separated by the slit, the improvement comprising: a first roller assembly mounted on the frame and having a first roller located beyond the first knife and aligned with the nip such that one face on each of the strips will pass along it with the slit being between the ends of the first roller, and a second roller assembly mounted on the frame and having a second roller located beyond the second knife and aligned with the nip such that the other face of each of the strips will pass along it with the slit being between the ends of the second roller, each roller assembly including a mount, a spring pad on the mount, a pair of pivot arms attached to the mount such that they pivot about an axis that is parallel to the axes of the mandrels, a spacer located between and attached to the pivot arms of the assembly, the roller for each roller assembly being carried by the pivot arms of the assembly and rotating about an axis that is offset in the direction of the strips from the axis of the arms, yet parallel to the axis of the arms, and a spring carried by the mount where it is located between and acts against the spring pad and the spacer, so that the spring acts upon the arms to urge the roller that is carried by the arms toward the path taken by the strips of metal sheet as they emerge from the knives.

2. In combination with a machine for slitting metal sheet, said machine having at least one pair of knives including disks which rotate about parallel axes and approach each other at a nip into which the metal sheet passes and where the metal sheet is fractured, so that sheet leaves the nip along a path as strips separated by a slit, the improvement comprising: first and second pivot mounts mounted on the machine; first pivot arms on the first pivot mount where they pivot about an axis parallel to the axes of the knife disks; second pivot arms on the second pivot mount where they pivot about an axis parallel to the axes of the knife disks; a first roller carried by the first arms; and a second roller carried by the second arms; the first and second rollers being located beyond the nip and being capable of rotating about axes parallel to the axes of rotation for the knife disks, the rollers being aligned with the nip between the knife disks and being along the path taken by the strips so as to receive the strips, with the slit being located between the ends of the rollers, each roller having a substantially cylindrical surface along which it contacts the strips that emerge from the nip and the cylindrical surface being at least about 2 inches long, the rollers being urged together so that the strips will be compressed between them, whereby the rollers reduce distortion of the strips.

3. In a slitting machine including a frame, first and second mandrels mounted on the frame for rotation about parallel axes, and first and second knives mounted on the first and second mandrels, respectively, with each knife having a disk which rotates with its mandrel, the disks of the first and second knives, when rotating, approaching each other at a nip and being located such that metal sheet upon entering the nip is fractured by the disks, thus imparting a slit to the metal sheet and dividing the sheet into strips which are separated by the slit, the improvement comprising: a first roller assembly mounted on the frame and having a first roller located beyond the first knife and aligned with the nip such that one face on each of the strips will pass along it with the slit being between the ends of the first roller, and a second roller assembly mounted on the frame and having a second roller located beyond the second knife and aligned with the nip such that the other face of each of the strips will pass along it with the slit being between the ends of the second roller, each roller assembly including a mount, a pair of pivot arms attached to the mount such that they pivot an axis that is parallel to the axes of the mandrels, the roller for each roller assembly being carried by the pivot arms of the assembly and rotating about an axis that is offset in the direction of the strips from the axis of the arms, yet parallel to the axis of the arms, the roller of each roller assembly having a substantially cylindrical exterior surface along which it contacts the strips that emerge from the nip formed by the disks and the cylindrical surface being at least about 2 inches long, a spring carried by the mount and acting upon the arms to urge the roller that is carried by the arms toward the path taken by the strips of metal sheet as they emerge from the knives.

4. In a slitting machine including a frame, first and second mandrels mounted on the frame for rotation about parallel axes, and first and second knives mounted on the first and second mandrels, respectively, with each knife having a disk which rotates with its mandrel, the disks of the first and second knives, when rotating, approaching each other at a nip and being located such that metal sheet upon entering the nip is fractured by the disks, thus imparting a slit to the metal sheet and dividing the sheet into strips which are separated by the slit, the improvement comprising: first and second tracks located on the frame parallel to the axes of the mandrels; a first roller assembly mounted on the frame and having a first roller located beyond the first knife and aligned with the nip such that one face on each of the strips will pass along it with the slit being between the ends of the first roller; and a second roller assembly mounted on the frame and having a second roller located beyond the second knife and aligned with the nip such that the other face of each of the strips will pass along it with the slit being between the ends of the second roller, each roller assembly including a mount, with the mount of the first roller assembly being fitted to the first track such that it can slide along the first track, yet cannot leave the first track; and the mount of the second roller assembly being fitted to the second track such that it can slide along the second track, yet cannot leave the second track, each roller assembly further including a pair of pivot arms attached to the mount such that they pivot about an axis that is parallel to the axes of the mandrels, the roller for each roller assembly being carried by the pivot arms of the assembly and rotating about an axis that is offset in the direction of the strips from the axis of the arms, yet parallel to the axis of the arms, and a spring carried by the mount and acting upon the arms to urge the roller that is carried by the arms toward the path taken by the strips of metal sheet as they emerge from the knives.

5. The combination according to claim 4 wherein each roller assembly has a clamp which is attached to the pivot mount of the roller assembly; and wherein the pivot mount and clamp of the roller assembly are configured to capture the track along which the roller assembly moves.

6. The combination according to claim 5 wherein the pivot mount for each pivot assembly projects from the track for the pivot assembly toward the path taken by the strips of metal sheet as they emerge from the knives, and the arms of the pivot assembly extend obliquely with respect to the path such that the axes of the rollers are offset in the direction of the path with respect to the axes on which the pivot arms pivot on their mounts.

7. In combination with a machine for slitting metal sheet, said machine having at least one pair of knives including disks which rotate about parallel axes and approach each other at a nip into which the metal sheet passes to be fractured, so that sheet leaves the nip along a path as strips separated by a slit, the improvement comprising: first and second rollers which are located beyond the nip and rotate about axes that are parallel to the axes of rotation for the knife disks, the rollers being aligned with the nip between the knife disks and being along the path taken by the strips so the strips pass between the rollers with the slit being located between the ends of the rollers, the rollers having substantially cylindrical exterior surfaces along which they contact the strips laterally from the slit and being urged together with enough force to reduce distortions imparted to the strips by the knives.

8. The combination according to claim 7 wherein the cylindrical surfaces of the rollers are at least about 2 inches long.

9. The combination according to claim 7 wherein the cylindrical surfaces of the rollers are between about 2 inches and about 4 inches long.

10. A roller assembly for installation on a machine for slitting metal sheet to reduce distortion of the metal sheet after it is slit, said roller assembly comprising: a pivot mount configured at one end to engage a track; pivot arms attached to the other end of the mount for pivotal movement about a first axis, the arms projecting away from the pivot mount; a roller carried by the pivot arms for rotation about a second axis that is parallel to the first axis; a spacer extending between the pivot arms and located outwardly from the pivot mount; a spring pad on the pivot mount and located opposite the spacer; and a spring located between the spacer and the spring pad for urging the pivot arms and the roller away from the spring pad.

11. A roller assembly according to claim 10 wherein the spring comprises a succession of Belleville washers.

12. A roller assembly according to claim 10 wherein the pivot mount contains a groove that extends parallel to the axes, the groove being configured to receive a track such that the pivot mount can slide along the track.

13. A process for reducing distortion of metal sheet by rotating knives when such knives slit the sheet, said process comprising passing the metal sheet between opposed rollers after it is slit, with the rollers bridging the slit in the sheet and being narrower than the sheet so that they do not traverse the sheet, the rollers being urged together such that the metal sheet on both sides of the slit is subjected to a compressive force exerted by the opposed rollers, the rollers having substantially cylindrical surfaces along which they contact the metal sheet, with the cylindrical surfaces being at least about 2 inches long and being hard enough to reduce distortion imparted to the sheet by the rotating knives and to iron out burrs.

14. The process according to claim 13 wherein the opposed rollers are urged together under a spring bias.

\* \* \* \* \*